US011735025B2

(12) United States Patent
Jonsson

(10) Patent No.: US 11,735,025 B2
(45) Date of Patent: Aug. 22, 2023

(54) STORING EVENTS OF A SENSOR DEVICE

(71) Applicant: ASSA ABLOY AB, Stockholm (SE)

(72) Inventor: Tomas Jonsson, Rönninge (SE)

(73) Assignee: ASSA ABLOY AB, Stockholm (SE)

( * ) Notice: Subject to any disclaimer, the term of this patent is extended or adjusted under 35 U.S.C. 154(b) by 346 days.

(21) Appl. No.: 16/960,275

(22) PCT Filed: Dec. 18, 2018

(86) PCT No.: PCT/EP2018/085649
§ 371 (c)(1),
(2) Date: Jul. 6, 2020

(87) PCT Pub. No.: WO2019/141473
PCT Pub. Date: Jul. 25, 2019

(65) Prior Publication Data

US 2021/0248897 A1 Aug. 12, 2021

(30) Foreign Application Priority Data

Jan. 22, 2018 (EP) .................................... 18152789

(51) Int. Cl.
*B32B 3/30* (2006.01)
*B60R 11/04* (2006.01)
*G08B 21/18* (2006.01)

(52) U.S. Cl.
CPC .................................... *G08B 21/18* (2013.01)

(58) Field of Classification Search
CPC ............ G07C 9/00571; G07C 9/00309; G07C 2009/00769; G07C 2209/62; G07C 2009/00746; G07C 9/00944; H04W 4/80; H04W 4/38; E05F 15/00; E05F 15/77; E05Y 2201/43; E05Y 2400/44; E05Y 2400/504; E05Y 2400/654; E05Y 2400/66; E05Y 2900/106; E05Y 2400/42; E05Y 2400/852; G08B 21/18; F25D 2700/00; G06Q 10/087
See application file for complete search history.

(56) References Cited

U.S. PATENT DOCUMENTS 9,235,976 B2 * 1/2016 Sloo ........................ G08B 29/02
9,489,829 B2 * 11/2016 Sloo ........................ H04L 67/10
9,859,741 B1 * 1/2018 Beagley ................... G08B 3/10
(Continued)

OTHER PUBLICATIONS

Extended Search Report for European Patent Application No. 18152789.6, dated Jul. 25, 2018, 9 pages.
(Continued)

*Primary Examiner* — Hai Phan
*Assistant Examiner* — Son M Tang
(74) *Attorney, Agent, or Firm* — Schwegman Lundberg & Woessner, P.A.

(57) ABSTRACT

It is provided a sensor device comprising: a proximity sensor; a processor; a wireless communication module; and a memory. The memory stores instructions that, when executed by the processor, cause the sensor device to: receive a user input signal; determine when the received user input signal matches a signal template being associated with an event; store in the memory a record indicating an occurrence of the event associated with the user input signal; and transmit, once the wireless communication module is active, any stored records.

12 Claims, 3 Drawing Sheets

(56) References Cited

U.S. PATENT DOCUMENTS 9,912,920 B2 * 3/2018 Chuter .................... H04N 7/186
10,111,306 B1 * 10/2018 Yon ...................... H05B 47/175
11,399,076 B2 * 7/2022 Li ......................... H04L 67/306
11,477,159 B1 * 10/2022 McPherson ............. H04W 4/80
2003/0061344 A1 3/2003 Monroe
2004/0233054 A1 * 11/2004 Neff ..................... G06Q 20/203 340/539.1
2008/0094204 A1 * 4/2008 Kogan ................... G08B 29/18 340/539.22
2008/0165250 A1 * 7/2008 Ekdahl ................. G07C 5/0891 348/148
2009/0189779 A1 * 7/2009 Gao ...................... G08C 17/00 340/901
2010/0052903 A1 * 3/2010 Tiwari ................. G08B 25/003 340/541
2011/0241877 A1 * 10/2011 Wedig .................... G08B 17/00 340/540
2012/0113253 A1 * 5/2012 Slater ..................... H04N 7/185 348/143
2013/0008958 A1 * 1/2013 Smith ................ G07C 9/00904 235/382
2014/0165728 A1 * 6/2014 Chaume ............. G01N 29/2475 73/584
2014/0300461 A1 * 10/2014 Stark ...................... G08B 21/02 340/457
2015/0254948 A1 * 9/2015 Acosta ................... G08B 13/08 340/541
2015/0355828 A1 * 12/2015 Kiyomasa ............... E05F 15/70 715/771
2015/0365570 A1 * 12/2015 Kim ..................... H04N 5/2252 348/374
2016/0050399 A1 * 2/2016 Chuter ................... H04N 7/186 348/155
2016/0094559 A1 * 3/2016 Frenette ................ H04L 63/101 726/4
2016/0148487 A1 * 5/2016 Thomas .............. G06F 3/04886 340/686.6
2016/0241660 A1 * 8/2016 Nhu ........................ H04W 4/80
2017/0211874 A1 7/2017 Kim et al.
2017/0313269 A1 11/2017 Breed
2017/0354326 A1 * 12/2017 Pugh ......................... A61B 3/10
2018/0047265 A1 * 2/2018 Rodolico ........... G08B 13/1663
2018/0229786 A1 * 8/2018 Weaver .................. B62D 63/08
2020/0217121 A1 * 7/2020 Paulsson ................. E05F 15/70
2021/0248897 A1 * 8/2021 Jonsson ................. G08B 21/18
2022/0092898 A1 * 3/2022 Wu .................... G07C 9/00571
2022/0283520 A1 * 9/2022 Fan ..................... G03F 7/70858
2022/0319287 A1 * 10/2022 Trapani .............. G08B 13/1609

OTHER PUBLICATIONS

International Search Report and Written Opinion for International (PCT) Patent Application No. PCT/EP2018/085649, dated Mar. 4, 2019, 14 pages.

International Preliminary Report on Patentability for International (PCT) Patent Application No. PCT/EP2018/085649, dated May 4, 2020, 13 pages.

Official Action for European Patent Application No. 18816157.4, dated Aug. 10, 2021, 7 pages.

* cited by examiner

STORING EVENTS OF A SENSOR DEVICE

CROSS REFERENCE TO RELATED APPLICATIONS

This application is a national stage application under 35 U.S.C. 371 and claims the benefit of PCT Application No. PCT/EP2018/085649 having an international filing date of Dec. 18, 2018, which designated the United States, which PCT application claimed the benefit of Europe Patent Application No. 18152789.6 filed Jan. 22, 2018, the disclosure of each of which are incorporated herein by reference.

TECHNICAL FIELD

The invention relates to a sensor device, a method, a computer program and a computer program product for recording events of a sensor device.

BACKGROUND

Sensors devices are self contained devices containing one or more sensors, processor, memory, power and wireless communication capabilities. These sensor devices have drastically reduced in size recently and are increasing in popularity for a variety of different uses. For instance, sensor devices can use an included proximity sensor to detect whether a barrier, such as a door or window, is open or closed.

Once the sensor device is manufactured, it moves through the supply chain until it becomes operational. Currently, there is no convenient way to monitor supply chain events for a sensor device.

US 2015/254948 A1 discloses a container breach detector system. US 2016/050399 A1 discloses a wireless Peephole Camera and Door Status Indicator. US 2017/211874 A1 discloses a refrigerator. US 2017/313269 A1 discloses shipping container information recordation techniques. US 2004/233054 A1 discloses a wireless monitoring device.

SUMMARY

It is an object to provide a way to monitor supply chain events for a sensor device.

According to a first aspect, it is provided a sensor device comprising: a proximity sensor; a processor; a wireless communication module; and a memory. The memory stores instructions that, when executed by the processor, cause the sensor device to: receive a user input signal; determine when the received user input signal matches a signal template being associated with an event; store in the memory a record indicating an occurrence of the event associated with the user input signal; and transmit, once the wireless communication module is active, any stored records.

The record may comprise a timestamp.

The record may indicate an event in a supply chain related to the installation of the sensor device.

According to a second aspect, it is provided a method for recording events of a sensor device comprising: a proximity sensor; a processor; a wireless communication module; and a memory. The method is performed in the sensor device and comprises the steps of: receiving a user input signal; determining when the received user input signal matches a signal template being associated with an event; storing in the memory a record indicating an occurrence of the event associated with the user input signal; and transmitting, once the wireless communication module is active, any stored records.

The record may comprise a timestamp.

The user input signal may be a light signal.

The user input signal may be a knock pattern.

The method may further comprise temporarily enabling, when the user input signal matches a signal template, the wireless communication module to transfer data.

The step of determining may comprise matching the received user input signal against a plurality of signal templates respectively associated with an event.

The plurality of events may comprise a first event for when the sensor device is installed in a barrier assembly and a second event for when the barrier assembly is installed in a building.

The method may further comprise the step of: receiving a signal indicating at least one of the type of barrier assembly and an identity of the barrier assembly.

The plurality of events may comprise a third event for when the sensor device is configured to be in an operational state.

The step of transmitting may be triggered by the sensor device when the sensor device is in the operational state.

The method may further comprise the step of: storing, when an accelerometer of the sensor device indicates an acceleration greater than a threshold amount, a record indicating an occurrence of excessive acceleration.

According to a third aspect, it is provided a computer program for recording events of a sensor device comprising: a proxy sensor; a processor; a wireless communication module; and a memory. The computer program comprises computer program code which, when run on a sensor device, causes the sensor device to: receive a user input signal; determine when the received user input signal matches a signal template being associated with an event; store a record indicating an occurrence of the event associated with the user input signal; and transmit, once the wireless communication module is active, any stored records.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the realisation that the sensor device can receive user input signals to thereby track events of a sensor device, particularly when applied in a logistics scenario. Records of the events are then transmitted once connectivity for the sensor device is available.

Figure 1:
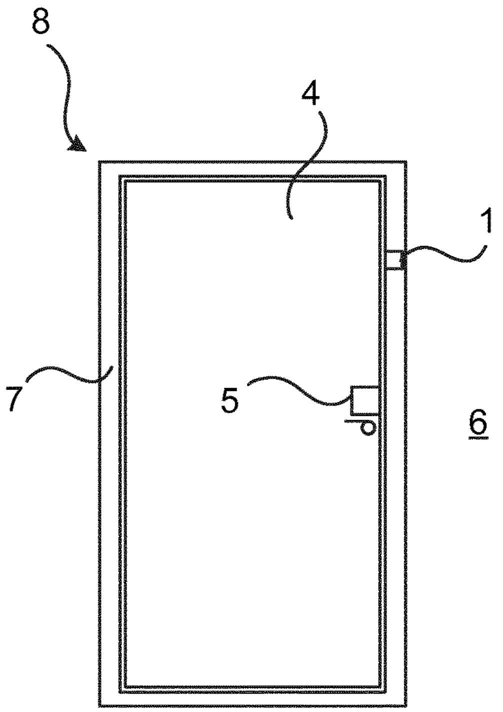
FIG. 1 is a schematic diagram illustrating an environment in which embodiments presented herein can be applied.

FIG. 1 is a schematic diagram illustrating an environment in which embodiments presented herein can be applied.

A barrier 4, which can be e.g. be a window, door, cabinet front, drawer, gate, etc., can be manipulated to be in either an open state or a closed state. Optionally, the ability to open the barrier 4 is selectively controlled using a lock 5. The barrier is provided in surrounding structure 7, such as a door frame or window frame. Together, the barrier 4 and the surrounding structure 7 form a barrier assembly 8. The surrounding structure 7 is provided to allow the barrier 5 to be kept in a closed state. In, or attached to, the surrounding structure 7, one or more sensor devices 1 are provided. The, or each, sensor device 1 comprises one or more proximity sensors, e.g. to detect the presence of the barrier 4, to thereby determine whether the barrier 4 is open or closed. The barrier assembly is installed in a wall 6 or similar, which can form part of a building.

Figure 2:
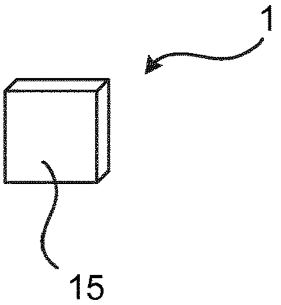
FIG. 2 is a schematic diagram illustrating the sensor device of FIG. 1, where the housing of the sensor device is illustrated.

FIG. 2 is a schematic diagram illustrating the sensor device of FIG. 1 where the housing of the sensor device is seen.

The sensor device 1 can be made very small, about 10 mm×10 mm×3 mm. Other sizes are also possible. The sensor device 1 contains all components (see FIG. 3 and text below) inside its housing 15. When light signals are used to record events, the housing 15 is sufficiently light permeable for light to pass through the housing 15 to reach a light sensor provided on the inside of the housing. The housing 15 can be transparent but could also be semi-transparent. In embodiments presented herein, signals (e.g. light signals or 3*o* knock patterns) which do not need any perforation of the housing are used to control the functional state of the sensor device. In this way, the housing can be provided such that it completely encloses the sensor device 1. Hence, there are no perforations in the enclosure, e.g. for components such as buttons, etc. as is provided in the prior art. The completely enclosing housing 15 provides excellent durability and reliability since the housing protects both from physical damage and from environmental issues such as water, etc.

Figure 3:
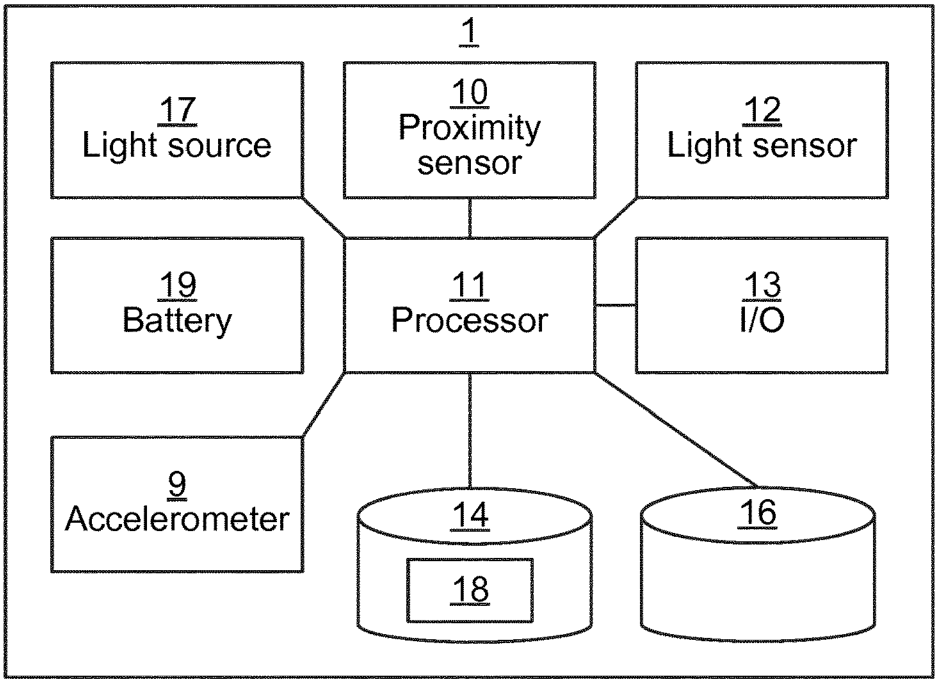
FIG. 3 is a schematic diagram illustrating components of the sensor device of FIG. 1 and FIG. 2 according to one embodiment.

FIG. 3 is a schematic diagram illustrating components of the sensor device of FIG. 1 and FIG. 2 according to one embodiment. A processor 11 is provided using any combination of one or more of a suitable central processing unit (CPU), multiprocessor, microcontroller, digital signal processor (DSP), capable of executing software instructions 18 stored in a memory 14, which can thus be a computer program product. The processor 11 could alternatively be implemented using an application specific integrated circuit (ASIC), field programmable gate array (FPGA), etc. The processor 11 can be configured to execute the method described with reference to FIG. 5 below.

The memory 14 can be any combination of random access memory (RAM) and/or read only memory (ROM). The memory 14 also comprises persistent storage, which, for example, can be any single one or combination of solid-state memory, magnetic memory, and optical memory.

A data memory 16 is also provided for reading and/or storing data during execution of software instructions in the processor 11. The data memory 16 can be any combination of RAM and/or ROM.

The sensor device 1 further comprises wireless communication module 13 for wireless radio communication with other external entities. The wireless communication module 13 can support any suitable wireless protocol, e.g. Bluetooth or Bluetooth Low Energy (BLE), ZigBee, any of the IEEE 802.11x standards (also known as WiFi), etc.

One or more proximity sensors 10 can be used to gain information about the environment of the sensor device 1. The proximity sensor (s) can detect the 3*o* presence of an object in the vicinity of the sensor device 1. Optionally, the proximity sensor 10 is based on inductive sensing, whereby the presence of metal is detected. Alternatively or additionally, the proximity sensor is based on magnetic field detection.

A light sensor 12 is configured to detect light. The detected light can be used to change supply chain state and functional state of the sensor device. The light sensor 12 can be made to operate on extremely low power when the sensor device 1 is not operational. When in low power, some or all of other components of the sensor device can be in a sleep state. Only when a particular light signal (which can be a predetermined sequence of light pulses) is detected, does the light sensor 12 provide a wakeup signal to components of the sensor device which are in a sleep state, e.g. by sending a wakeup signal to such components. An event related to the light signal can then be recorded, after which the sensor device can return to its low power state. The light signal can e.g. be provided to the sensor device using an app of a smart phone controlling a flash.

Optionally, the sensor device 1 also comprises a light source 17. The light source 17 is any suitable light source and can e.g. be a Light Emitting Diode (LED) which is very energy efficient. The light source 17 can be used as output (to a user or to an external device) to provide feedback to a user interacting with the sensor device 1.

The sensor device 1 further comprises a battery 19 which is also enclosed by the housing. The battery 19 powers all electric and electronic components of the sensor device 1. Due to the low power consumption of the sensor device 1, the battery 19 can power the sensor device 1 for a very long time, in the order of years. Hence, the battery can be a single use battery, which is not neither exchangeable nor chargeable. Since the type of battery is known from production, battery status determination (e.g. charge level) can be performed in a reliable manner.

An accelerometer 9 can be used to detect accelerations. Such accelerations can be used to detect user input signals, such as knock patterns, and/or to detect excessive acceleration, indicating potential damage to, e.g. a barrier assembly, in which the sensor device is installed. The acceleration can also be integrated to give velocity or double integrated to give position.

Other components of the sensor device 1 are omitted in order not to obscure the concepts presented herein.

Figure 4:
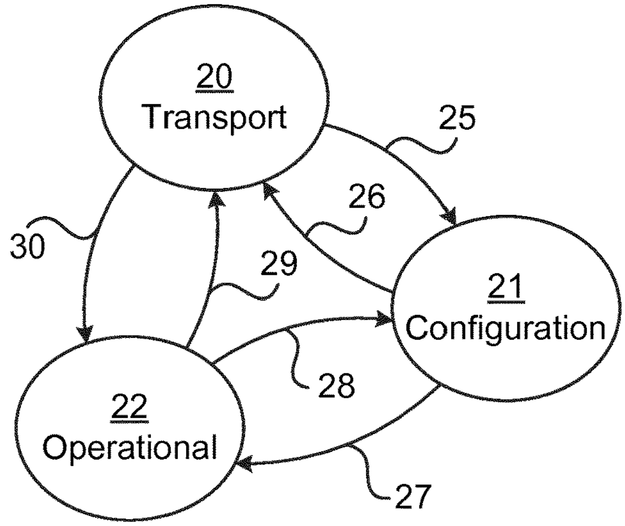
FIG. 4 is a state diagram illustrating functional states of the sensor device of FIGS. 1-3.

FIG. 4 is a state diagram illustrating functional states of the sensor device 1 of FIGS. 1-3. In FIG. 4, there are three functional states 20, 21, 22 shown. Each functional state differs from other functional states in the type of functionality that is provided by the sensor device. There can be more or fewer functional states.

In a transport state 20, one or more components of the sensor device are inactive to prevent any radio transmissions and to save power. Optionally, there is a low power communication interface allowing some or all parts of stored data in the sensor device to be read.

In a configuration state 21, the sensor device can be paired with another device, e.g. using BLE. A system interface can be available for configuration of the sensor device and information gathering for troubleshooting, such as checking a communication link with a gateway, etc. In the configuration state 21, the sensor device can be configured using wireless communication e.g. over BLE. For instance, a smartphone, tablet computer, laptop computer or desktop computer can be used to send configuration commands to the sensor device over the wireless interface.

In an operational state 22, the sensor device is in a normal operational state and communicates and senses its environment according to its programmed and configured function.

When in the transport state 20, the sensor device can transition 25 to the configuration state 21, e.g. when a light is provided on the sensor device. The sensor device can also be made to transition 30 from the transport state 20 to the operational state 22 e.g. using a light from an external device.

When in the configuration state 21, the sensor device can transition 26 to the transport state 20 by receiving an appropriate command from an external device. Since the wireless interface is available in the configuration state 21, the command can be sent either using light signals or using the wireless interface. Similarly, a command can be transmitted to the sensor device, causing the sensor device to transition 27 from the configuration state 21 to the operational state. It is to be noted that also when in the configuration state 21, the transition to the transport state 20 or the operational state 22 could alternatively or additionally also be triggered using light.

When in the operational state 22, the sensor device can transition 29 to the transport state 20 by receiving an appropriate command from an external device. Since the wireless interface is available in the operational state 22, the command can be sent either using light signals or using the wireless interface. Similarly, a command can be transmitted to the sensor device, causing the sensor device to transition 28 from the operational state 22 to the configuration state 21. It is to be noted that also when in the operational state 21, the transition to the transport state 20 or the configuration state 21 could alternatively or additionally be triggered using light.

It is to be noted that all transitions mentioned here do not need to be implemented.

Figure 5:
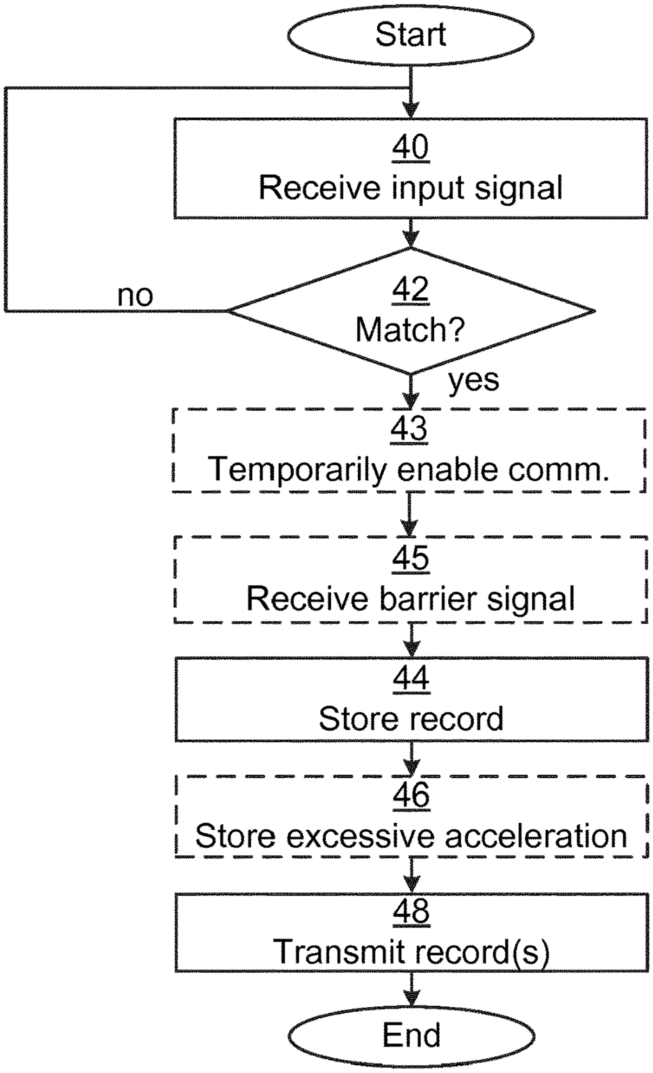
FIG. 5 is a flow chart illustrating embodiments of methods for transitioning between functional states of a sensor device.

FIG. 5 is a flow chart illustrating embodiments of methods for recording events of a sensor device, e.g. the sensor device of FIGS. 1-3 described above. The sensor device comprises at least one proximity sensor (such as a proximity sensor), and a wireless communication module.

In a receive input signal step 40, the sensor device receives a user input signal. The user input signal can e.g. be a light signal, of a predetermined sequence of light pulses to prevent state transition by light from cars, sunlight, etc. Alternatively, the user input signal can be a knocking pattern, detected by an accelerometer of the sensor device. For instance, a double knock can indicate a first event and a triple knock can indicate a second event. Alternatively, the user input signal can be a signal detected by the proximity sensor, e.g. by providing a metal item or a magnet by the sensor, or removing a metallic tape covering the sensor device.

In a conditional match step 42, the sensor device determines when the received user input signal matches a signal template being associated with an event.

This step optionally comprises matching the received user input signals against a plurality of signal templates respectively associated with an event. The plurality of events can comprise a first event (see 60 of FIG. 7) for when the sensor device is installed in barrier assembly and a second event (see 62 of FIG. 7) for when the barrier assembly is installed in a building. Optionally, the plurality of events further comprises a third event (see 64 of FIG. 7) for when the sensor device is configured to be in an operational state. When there is no match, the method returns to the receive input signal step 40. Otherwise, the method proceeds.

In an optional temporarily enable communication step 43, the sensor device temporarily enables the wireless communication module to transfer data. This step occurs only when the user input signal matches a signal template. This allows a point in the logistics chain to temporarily read or write data from/to the sensor device when an event occurs.

In an optional receive barrier signal step 45, the sensor device receives a signal indicating at least one of the type of barrier assembly and an identity of the barrier assembly. In other words, when this step is performed, the sensor device receives the barrier assembly type (e.g. window model or door model) and/or barrier assembly identity (e.g. serial number of the barrier assembly).

In a store record step 44, the sensor device stores a record indicating an occurrence of the event associated with the user input signal. Optionally, the record comprises a timestamp. In this step, the processor and memory of the sensor device are active and to allow the record to be stored.

Optionally, the sensor device provides feedback on functional state transition using the light source forming part of the sensor device. The light from the light source can be modulated (e.g. in different patterns of light on/light off) to thereby enable the transmission of different messages. Optionally, different colours of the light source are used to indicate different message.

When step 45 is performed, the store record step 44 comprises storing a record of at least one of the type of barrier assembly and an identity of the barrier assembly.

After the record has been stored, the sensor device can enter a low power state where one or more components are powered off to save power.

In an optional store excessive acceleration step 46, the sensor device stores, when an accelerometer of the sensor device indicates an acceleration greater than a threshold amount, a record indicating an occurrence of excessive acceleration. Such excessive acceleration can e.g. indicate that the barrier assembly comprising the sensor device has been dropped, which can result in damage which, in this way, can be recorded.

In a transmit record(s) step 48, the sensor device transmits any stored records. This step is performed once the wireless communication module is active, when the sensor device is configured and is in the operational state. The records(s) can e.g. transmitted to a server belonging to a manufacturer of the barrier assembly.

This allows crucial logistics data to be collected and acted upon, e.g. by the barrier manufacturer, based on user input from a user, i.e. people handling the barrier. When step 45 is performed, the logistics data can be associated with a particular barrier type (e.g. product model) and/or serial number, allowing the barrier manufacturer to collect valuable statistics on produced barriers to act upon.

The transmit record(s) step 48 can be triggered by the sensor device when the wireless communication module enters the operational state. This is a push type communication, i.e. when the data source (in this case the sensor device) initiates the transmission. Alternatively or additionally, the records are transmitted in response to a request from a data requester, implementing a pull based communication.

Using the sensor device according to embodiments presented herein, the supply chain state of the sensor device can be recorded.

This will now be explained with further reference to FIG. 7, where states of the sensor device related to supply chain events are shown.

There are here four supply chain states shown. In a first supply chain state 50, the sensor device has been manufactured, but not installed.

In a second supply chain state 52, the sensor device has been installed in a barrier assembly (see 8 of FIG. 1), but not installed in a building. Consequently, the transition 60 from the first supply chain state 50 to the second supply chain state 52 represents an event of installing the sensor device in a barrier assembly.

In a third supply chain state 54, the sensor device (or more specifically the barrier assembly comprising the sensor device) has been installed in a building. Consequently, the transition 62 from the second supply chain state 52 to the third supply chain state 54 represents an event of installing the barrier assembly in a building.

In a fourth supply chain state 56, the sensor device has been configured and is in a normal operational state (corresponding to the operational state 22 of FIG. 4). Consequently, the transition 64 from the third supply chain state 54 to the fourth supply chain state 56 represents an event of configuring the sensor device to be in an operational state.

Hence, embodiments presented herein can be exploited in a complex supply chain scenario. The various states through the supply chain can be tracked by a user simply providing appropriate signals (e.g. using light or knock patterns) to the sensor device.

This allows aggregated data collection for sensor devices and barrier installations throughout the supply chain.

Figure 7:
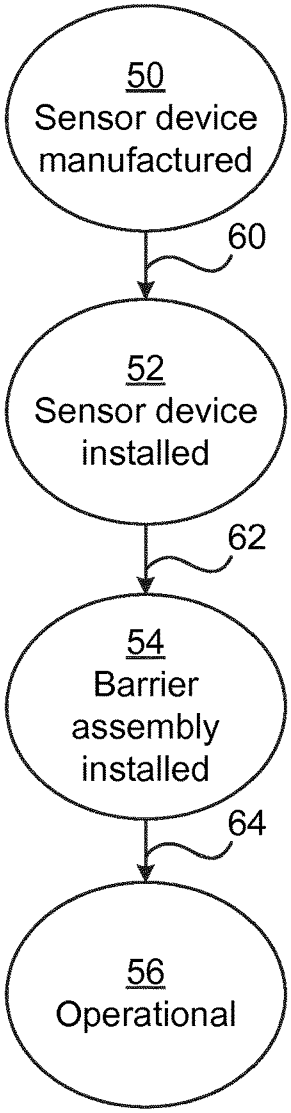
FIG. 7 is a state diagram illustrating functional states of the sensor device of FIGS. 1-3.

It is to be noted that additional supply chain states can be tracked than those shown in FIG. 7. Moreover, the sensor device can detect (e.g. using the accelerometer) when it is being transported or is stationary.

Figure 6:
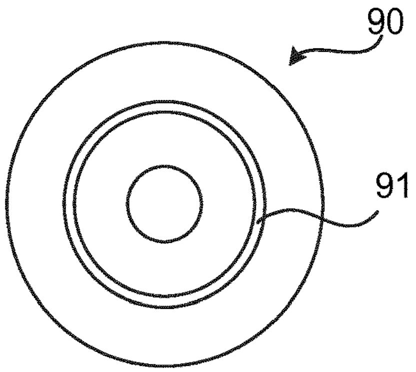
FIG. 6 shows one example of a computer program product comprising computer readable means.

FIG. 6 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 14 of FIG. 3. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A sensor device comprising: a proximity sensor; a processor; a wireless communication module; and a memory storing instructions that, when executed by the processor, cause the sensor device to:

receive an input signal;

determine when the received input signal matches a signal template being associated with an event;

store in the memory a record indicating an occurrence of the event associated with the input signal; and transmit, once the wireless communication module is active, any stored records.

ii. The sensor device according to embodiment i, wherein the record indicates an event in a supply chain related to the installation of the sensor device.

iii. A method for recording events of a sensor device comprising: a proximity sensor; a processor; a wireless communication module; and a memory, the method being performed in the sensor device and comprising the steps of:

receiving an input signal;

determining when the received input signal matches a signal template being associated with an event;

storing in the memory a record indicating an occurrence of the event associated with the input signal; and transmitting, once the wireless communication module is active, any stored records.

iv. The method according to embodiment iii, wherein the record comprises a timestamp.

v. The method according to embodiment iii or iv, wherein the input signal is a light signal.

vi. The method according to embodiment iii or iv, wherein the input signal is a knock pattern.

vii. The method according to any one of embodiments iii to vi, further comprising temporarily enabling, when the input signal matches a signal template, the wireless communication module to transfer data.

viii. The method according to any one of embodiments iii to vii, wherein the step of determining comprises matching the received input signal against a plurality of signal templates respectively associated with an event.

ix. The method according to embodiment viii, wherein the plurality of events comprise a first event for when the sensor device is installed in a barrier assembly and a second event for when the barrier assembly is installed in a building.

x. The method according to embodiment ix, further comprising the step of:

receiving a signal indicating at least one of the type of barrier assembly and an identity of the barrier assembly; and wherein the step of storing comprises storing a record of at least one of the type of barrier assembly and an identity of the barrier assembly.

xi. The method according to any one of embodiments ix or x, wherein the plurality of events comprise a third event for when the sensor device is configured to be in an operational state.

xii. The method according to embodiment xi, wherein the step of transmitting is triggered by the sensor device when the wireless communication module is in the operational state.

xiii. The method according to any one of embodiments iii to xii, further comprising the step of:

storing, when an accelerometer of the sensor device indicates an acceleration greater than a threshold amount, a record indicating an occurrence of excessive acceleration.

xiv. A computer program for recording events of a sensor device comprising: a proxy sensor; a processor; a wireless communication module; and a memory, the computer program comprising computer program code which, when run on a sensor device, causes the sensor device to:

receive an input signal;

determine when the received input signal matches a signal template being associated with an event;

store a record indicating an occurrence of the event associated with the input signal; and transmit, once the wireless communication module is active, any stored records.

xv. A computer program product comprising a computer program according to embodiment xiv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A sensor device comprising:

a proximity sensor; a processor;

a wireless communication module; and a memory storing instructions that, when executed by the processor, cause the sensor device to: receive a user input signal;

determine when the received user input signal matches a signal template being associated with an event of a plurality of events, which comprises matching the received user input signal against a plurality of signal templates respectively associated with events of the plurality of events, wherein the plurality of events comprises a first event for when the sensor device is installed in a barrier assembly and a second event for when the barrier assembly is installed in a building, wherein the barrier assembly comprises the barrier and a surrounding structure, wherein the surrounding structure allows the barrier to be kept in a closed state;

store in the memory a record indicating an occurrence of the event associated with the user input signal; and transmit, once the wireless communication module is active, any stored records.

2. The sensor device according to claim 1, wherein the record indicates an event in a supply chain related to the installation of the sensor device.

3. A method for recording events of a sensor device comprising: a proximity sensor;

a processor;

a wireless communication module; and a memory, the method being performed in the sensor device and comprising:

receiving a user input signal;

determining when the received user input signal matches a signal template being associated with an event of a plurality of events, which comprises matching the received user input signal against a plurality of signal templates respectively associated with events of the plurality of events, wherein the plurality of events comprises a first event for when the sensor device is installed in a barrier assembly and a second event for when the barrier assembly is installed in a building, wherein the barrier assembly comprises the barrier and a surrounding structure, wherein the surrounding structure allows the barrier to be kept in a closed state;

storing in the memory a record indicating an occurrence of the event associated with the user input signal; and transmitting, once the wireless communication module is active, any stored records.

4. The method according to claim 3, wherein the record comprises a timestamp.

5. The method according to claim 3, wherein the user input signal is a light signal.

6. The method according to claim 3, wherein the user input signal is a knock pattern.

7. The method according to claim 3, further comprising temporarily enabling, when the user input signal matches the signal template, the wireless communication module to transfer data.

8. The method according to claim 3, further comprising:

receiving a signal indicating at least one of the type of barrier assembly and an identity of the barrier assembly; and wherein the step of storing comprises storing a record of at least one of the type of barrier assembly and an identity of the barrier assembly.

9. The method according to claim 3, wherein the plurality of events comprises a third event for when the sensor device is configured to be in an operational state.

10. The method according to claim 9, wherein the step of transmitting is triggered by the sensor device when the wireless communication module is in the operational state.

11. The method according to claim 3, further comprising:

storing, when an accelerometer of the sensor device indicates an acceleration greater than a threshold amount, a record indicating an occurrence of excessive acceleration.

12. A non-transitory computer readable medium comprising a computer program stored thereon for recording events of a sensor device comprising:

a proxy sensor;

a processor;

a wireless communication module; and a memory, the computer program comprising computer program code which, when run on the sensor device, causes the sensor device to:

receive a user input signal;

determine when the received user input signal matches a signal template being associated with an event of a plurality of events, which comprises matching the received user input signal against a plurality of signal templates respectively associated with events of the plurality of events, wherein the plurality of events comprises a first event for when the sensor device is installed in a barrier assembly and a second event for when the barrier assembly is installed in a building, wherein the barrier assembly comprises the barrier and a surrounding structure, wherein the surrounding structure allows the barrier to be kept in a closed state;

store a record indicating an occurrence of the event associated with the user input signal; and transmit, once the wireless communication module is active, any stored records.

* * * * *